(12) United States Patent
Cok (10) Patent No.: US 7,067,756 B2
(45) Date of Patent: Jun. 27, 2006

(54) FLEXIBLE SHEET FOR RESISTIVE TOUCH SCREEN

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/988,343

(22) Filed: Nov. 12, 2004

(65) Prior Publication Data

US 2006/0102463 A1     May 18, 2006

(51) Int. Cl.
*H01H 9/00* (2006.01)

(52) U.S. Cl. ........................ 200/512; 345/173

(58) Field of Classification Search ............... 200/5 A, 200/600, 511, 512, 514; 29/622; 341/22; 345/168, 173, 174, 175
See application file for complete search history.

(56) References Cited

U.S. PATENT DOCUMENTS

| | | |
|---|---|---|
| 3,312,753 A | 4/1967 | Bailey, Jr. et al. |
| 3,900,442 A | 8/1975 | Zannucci et al. |
| 4,071,718 A | 1/1978 | Harden |
| 4,220,815 A | 9/1980 | Gibson et al. |
| 4,587,378 A | 5/1986 | Moore |
| 4,638,118 A | 1/1987 | Wang et al. |
| 4,739,007 A | 4/1988 | Okada et al. |
| 4,810,734 A | 3/1989 | Kawasumi et al. |
| 4,894,411 A | 1/1990 | Okada et al. |
| 4,911,536 A | 3/1990 | Ditzik |
| 5,062,198 A | 11/1991 | Sun |
| 5,102,948 A | 4/1992 | Deguchi et al. |
| 5,164,440 A | 11/1992 | Deguchi et al. |
| 5,164,460 A | 11/1992 | Yano et al. |
| 5,220,136 A | 6/1993 | Kent |
| 5,228,562 A * | 7/1993 | Burk .................... 200/512 |
| 5,248,720 A | 9/1993 | Deguchi et al. |
| 5,854,326 A | 12/1998 | Sakaya et al. |
| 5,891,611 A | 4/1999 | Majumdar et al. |
| 5,955,198 A | 9/1999 | Hashimoto et al. |
| 6,034,163 A | 3/2000 | Barbee et al. |
| 6,163,313 A | 12/2000 | Aroyan et al. |
| 6,177,926 B1 | 1/2001 | Kunert |
| 6,330,048 B1 | 12/2001 | Shiomi et al. |
| 6,639,163 B1 * | 10/2003 | Fukui et al. ............ 200/512 |
| 6,744,425 B1 * | 6/2004 | Yoshikawa et al. ...... 345/173 |
| 6,774,331 B1 * | 8/2004 | Den Ridder et al. ..... 200/512 |

(Continued)

FOREIGN PATENT DOCUMENTS

JP      10/48636      2/1998

(Continued)

OTHER PUBLICATIONS

US Serial No. 10/987,467; filed Nov. 12, 2004; titled "Integral Spacer Dots For Touch Screen"; of Robert P. Bourdelais, Cheryl J. Brickley, Gerald T. Hertzel, Ronald S. Cok.

(Continued)

*Primary Examiner*—Michael A. Friedhofer
(74) *Attorney, Agent, or Firm*—Andrew J. Anderson (57) ABSTRACT

A resistive touch screen, comprising: a) a substrate; b) a first conductive layer located on the substrate; c) a flexible cover sheet having integral compressible spacer dots; d) a second conductive layer located on the flexible cover sheet between and over the integral spacer dots; and e) an insulative layer located on the second conductive layer locally over the integral spacer dots.

22 Claims, 5 Drawing Sheets

U.S. PATENT DOCUMENTS

| | | |
|---|---|---|
| 6,777,626 B1 * | 8/2004 | Takabatake et al. ........ 200/5 A |
| 6,784,948 B1 * | 8/2004 | Kawashima et al. .......... 349/12 |
| 6,787,253 B1 * | 9/2004 | Iwabuchi et al. ........... 428/698 |
| 2001/0046604 A1 | 11/2001 | Geaghan |
| 2002/0031622 A1 | 3/2002 | Ippel et al. |
| 2002/0094660 A1 | 7/2002 | Getz et al. |
| 2003/0087107 A1 | 5/2003 | Varaprasad et al. |
| 2003/0154637 A1 | 8/2003 | Kainen |
| 2003/0160754 A1 | 8/2003 | Hanson et al. |
| 2003/0170492 A1 | 9/2003 | Anderson et al. |
| 2003/0214720 A1 | 11/2003 | Bourdelais et al. |
| 2004/0090426 A1 | 5/2004 | Bourdelais et al. |
| 2004/0090429 A1 | 5/2004 | Geaghan et al. |
| 2004/0212599 A1 | 10/2004 | Cok et al. |

FOREIGN PATENT DOCUMENTS

| | | |
|---|---|---|
| JP | 2002-149346 | 5/2002 |
| WO | WO 99/63792 | 12/1999 |

OTHER PUBLICATIONS

US Serial No. 10/988,340; filed Nov. 12, 2004; titled "Variable Spacer Dots For Touch Screen"; of Robert P. Bourdelais, Cheryl J. Brickey, Ronald S. Cok.

* cited by examiner

FLEXIBLE SHEET FOR RESISTIVE TOUCH SCREEN

FIELD OF THE INVENTION

This invention relates to resistive touch screens and more particularly, to a flexible cover sheet and spacer dots separating the cover sheet from a substrate in a resistive touch screen.

BACKGROUND OF THE INVENTION

Resistive touch screens are widely used with conventional CRTs and flat-panel display devices in computers and in particular with portable computers.

Figure 3:
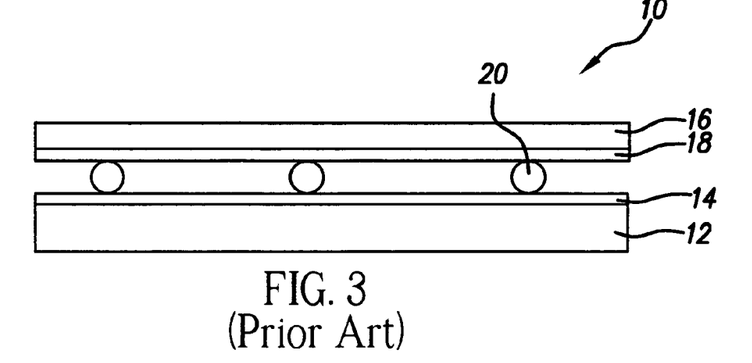
FIG. 3 is a schematic diagram showing a portion of a prior-art touch screen.

FIG. 3 shows a portion of a prior-art resistive touch screen 10 of the type shown in Published US Patent Application No. 2002/0094660A1, filed by Getz et al., Sep. 17, 2001, and published Jul. 18, 2002, which includes a rigid transparent substrate 12, having a first conductive layer 14. A flexible transparent cover sheet 16 includes a second conductive layer 18 that is physically separated from the first conductive layer 14 by spacer dots 20 formed on the second conductive layer 18 by screen printing.

Figure 4:
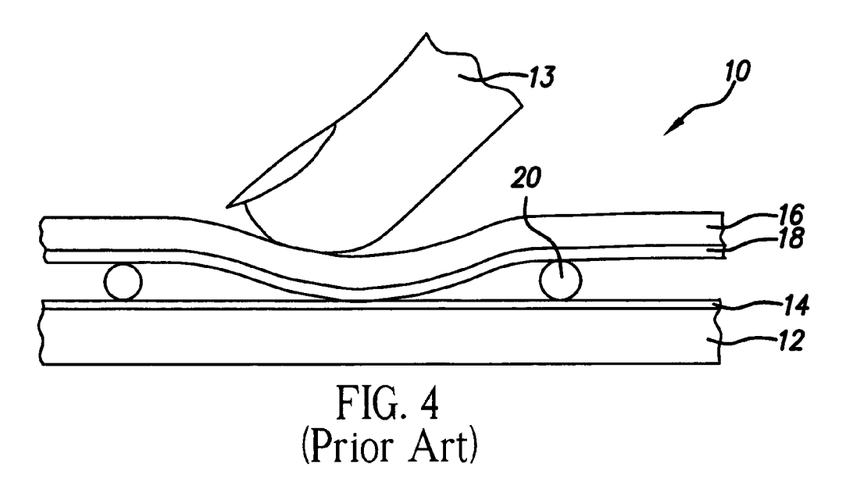
FIG. 4 is a schematic diagram illustrating the operation of the touch screen of FIG. 3.

Referring to FIG. 4, when the flexible transparent cover sheet 16 is deformed, for example by finger 13 pressure, to cause the first and second conductive layers to come into electrical contact, a voltage applied across the conductive layers 14 and 18 results in a flow of current proportional to the location of the contact. The conductive layers 14 and 18 have a resistance selected to optimize power usage and position sensing accuracy. The magnitude of this current is measured through connectors (not shown) connected to metal conductive patterns (not shown) formed on the edges of conductive layers 18 and 14 to locate the position of the deforming object.

Alternatively, it is known to form the spacer dots 20 for example by spraying through a mask or pneumatically sputtering small diameter transparent glass or polymer particles, as described in U.S. Pat. No. 5,062,198 issued to Sun, Nov. 5, 1991. The transparent glass or polymer particles are typically 45 microns in diameter or less and mixed with a transparent polymer adhesive in a volatile solvent before application. This process is relatively complex and expensive and the use of an additional material such as an adhesive can be expected to diminish the clarity of the touch screen. Such prior-art spacer dots are limited in materials selections to polymers that can be manufactured into small beads or UV coated from monomers.

It is also known to use photolithography to form the spacer dots 20. In these prior-art methods, the spacer dots may come loose and move around within the device, thereby causing unintended or inconsistent actuations. Furthermore, contact between the conductive layers 14 and 18 is not possible where the spacer dots are located, thereby reducing the accuracy of the touch screen. Stress at the locations of the spacer dots can also cause device failure after a number of actuations. Unless steps are taken to adjust the index of refraction of the spacer dots, they can also be visible to a user, thereby reducing the quality of a display located behind the touch screen.

U.S. Pat. No. 4,220,815 (Gibson et al.) and US Patent Application US20040090426 (Bourdelais et al.) disclose integral spacer dots on flexible cover sheets for touch screen applications. However, these simple integral spacer dots must not have their top surfaces coated with the conductive layer to avoid electrical shorts between the first and second conductive layers, 14 and 18. Such requirement adds complexity to the manufacturing process, and may negatively impact yields.

There is a need therefore for an improved means to separate the conductive layers of a touch screen and a method of making the same that improves the robustness of the touch screen and reduces the cost of manufacture.

SUMMARY OF THE INVENTION

In one embodiment, the invention is directed towards a resistive touch screen, comprising: a) a substrate; b) a first conductive layer located on the substrate; c) a flexible cover sheet having integral compressible spacer dots; d) a second conductive layer located on the flexible cover sheet between and over the integral spacer dots; and e) an insulative layer located on the second conductive layer locally over the integral spacer dots.

In a further embodiment, the invention is directed towards a method of making a resistive touch screen, comprising the steps of: a) providing a substrate; b) forming a first conductive layer on the substrate; c) providing a flexible cover sheet having integral compressible spacer dots on the cover sheet; d) forming a second conductive layer on the flexible cover sheet between and over the integral compressible spacer dots; e) forming an insulative layer locally on the second conductive layer over the integral compressible spacer dots; and f) locating the flexible cover sheet over the substrate such that when a force is applied to the flexible cover sheet at the location of one of the compressible spacer dots, the compressible spacer dot is compressed to allow electrical contact between the first and second conductive layers.

ADVANTAGES

The touch screen of the present invention has the advantages that it is simple to manufacture, and provides greater accuracy, robustness, and clarity.

DETAILED DESCRIPTION OF THE INVENTION

Figure 1:
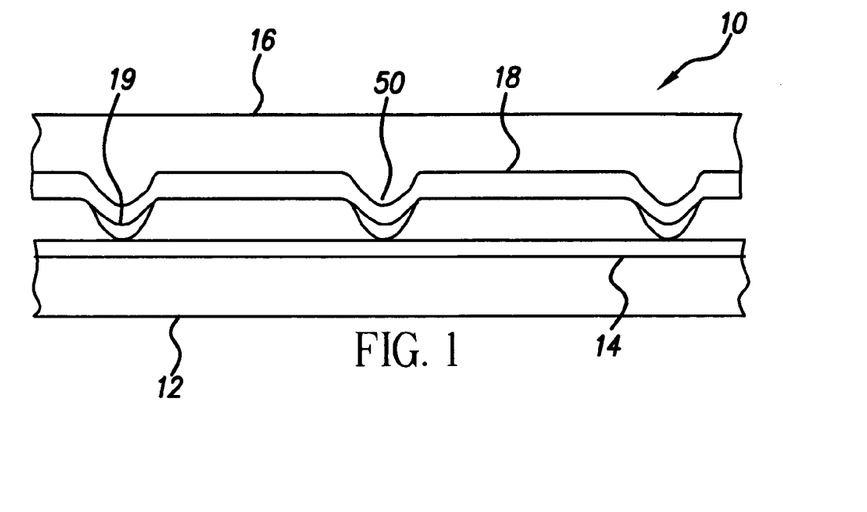
FIG. 1 is a schematic diagram showing a portion of a touch screen according to one embodiment of the present invention.

Referring to FIG. 1, the problems of the prior-art resistive touch screens are overcome through the use of a flexible cover sheet 16 having a second conductive layer 18 and integral compressible spacer dots 50 formed in the flexible cover sheet 16. The second conductive layer 18 on the flexible cover sheet 16 covers the peaks of the integral compressible spacer dots 50, and an insulative layer 19 is formed locally over the peaks of the integrated compressible spacer dots, as illustrated in further detail in FIG. 7 discussed below. The word "integral" means that the compressible spacer dots 50 are formed in and comprise the same material as the flexible cover sheet 16 for example by molding or embossing.

The insulative layer 19 formed over the integral compressible spacer dots 50 prevents the second conductive layer 18 deposited on the flexible cover sheet 16 from touching the first conductive layer 14 on substrate 12 of the touch screen 10. Because the peaks of the second conductive layer 18 in the region of the integral compressible spacer dots 50 are covered with an insulator, little or no current can flow between the conductive layers. While the various layers of the touch screen may be transparent or not for different applications, in a preferred embodiment each of the substrate, first conductive layer, flexible cover sheet, second conductive layer, and insulative layer are transparent to allow use in combination with displays.

Figure 2:
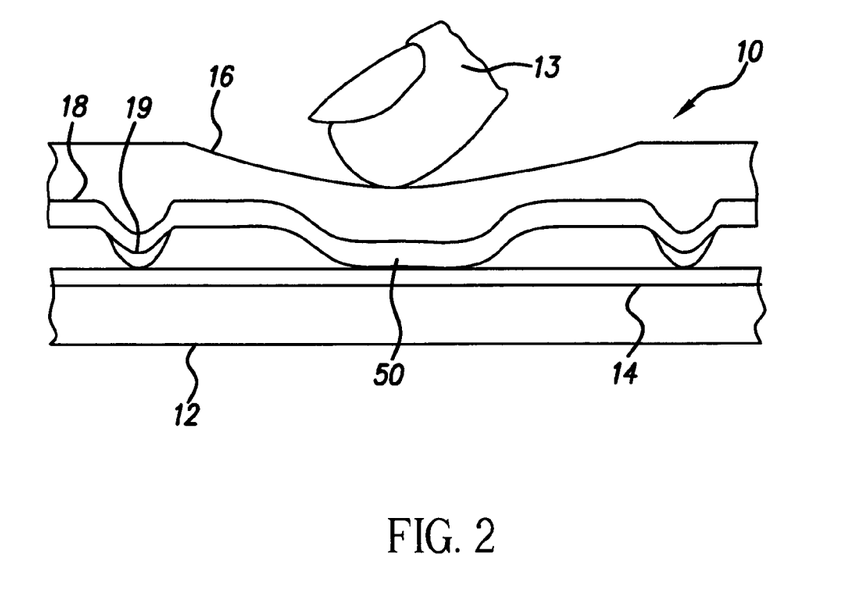
FIG. 2 is a schematic diagram illustrating the operation of the touch screen shown in FIG. 1.

Referring to FIG. 2, in operation when an external object such as a finger 13 or stylus deforms the flexible cover sheet 16, the flexible cover sheet 16 is pressed against the substrate 12 thereby causing the conductive layer 14 and conductive layer 18 surrounding the integral compressible spacer dots 50 to touch and close a circuit. Substrate 12 itself may be rigid or flexible. If the substrate is flexible, however, it should be less flexible than the cover sheet, or mounted upon a surface that is less flexible than the cover sheet. If the deformation occurs on one of the integral compressible spacer dots 50 (as shown), the spacer dot is compressed so that contact is made between conductive layers 14 and conductive regions of layer 18 surrounding the integral compressible spacer dots 50 and current can flow between the conductive layers. Since the stylus or finger 13 is typically larger than the integral compressible spacer dot 50, the insulative layer 19 at the top of the integral compressible spacer dot 50 does not inhibit the conductive layers 14 and 18 from touching in the regions between the spacer dots.

Because the integral compressible spacer dots 50 are an integral part of the flexible cover sheet 16, they are fixed in position and cannot move or come loose as can spacer dots composed of beads in an adhesive matrix, or dots that are formed by printing or photolithography. Moreover, the integral spacer dots can be smaller than conventional spacer dots (e.g. as small as 1 micron in diameter, usually 10 to 50 microns). Additional materials, such as adhesives, are unnecessary, thereby reducing manufacturing materials and steps and further improving the optical clarity of the device.

There are at least two methods for creating the integral compressible spacer dots integral to the flexible cover sheet. The first is to take an existing, formed flexible cover sheet with no spacer dots and emboss spacer dots in the flexible cover sheet by applying heat and pressure to the flexible cover sheet in a mold that defines a reverse image of the spacer dots. The heat and pressure reforms the flexible cover sheet so that the flexible cover sheet will have integral compressible spacer dots when the mold is removed. Such a mold can be, for example, a cylinder that rolls over a continuous sheet of flexible cover sheet material. In a second method melted polymer may be coated over the mold and forced into the cavities (for example by injection roll molding), allowed to cool, and then lifted from the mold. The mold may be provided with the cavities through conventional means, for example machining, bead blasting or etching. Electromechanical engraving and fast-tool servo processes which may be used to form a patterned cylinder mold for use in the present invention are also described in copending, commonly assigned U.S. Ser. No. 10/987,467, the disclosure of which is hereby incorporated by reference. The base of the dot 50 (where it is connected to the sheet 16) may be the maximum size of the spacer dot to facilitate the extraction of the shaped material from the mold. The molding process may be continuous roll molding.

With either method, a great variety of spacer dot shapes are possible, for example, cylinders, cubes, hemispheres, and pyramids. The spacer dot shape is dependent on a number of considerations, for example, the method used for manufacturing, the size of the object used to deform the cover sheet, the size of the dots, the flexible cover sheet material, and the number of activations of the device over its useable lifetime.

In one embodiment of the invention, the integral compressible spacer dots of the invention may have a flat-topped circularly cylindrical shape. A circular cylinder provides for specular light transmission and has impact resistance. Further, the ends of the cylinders can provide excellent optical contact with the substrate. The diameter and height of the cylinders can be adjusted to provide the desired compression profile. As used herein compression profile means the ability of the spacer dots to undergo the desired compression and expansion.

In another embodiment of the invention, the integral compressible spacer dots may be hemisphere-shaped. The hemisphere provides a precision gap as well as high light transmission. The hemisphere also provides excellent compression and fatigue characteristics. In another embodiment of the invention, the integral compressible spacer dots may be cylinder-shaped having rectangular cross sections. A rectangular compressible spacer dot (for example a cube) provides impact resistance as well as a precision optical spacing. In another embodiment, the integral compressible spacer dot may comprise a pyramid shape, which may have a flat top. A pyramid provides a precision optical gap as well as some light directing. A 45-degree pyramid in air will tend to focus transmitted light into a line perpendicular to the base of the pyramid providing both optical spacing as well as light directing. Further, the pyramid and hemisphere shapes provide a more rapidly changing compression gradient as the shape is compressed.

The flexible cover sheet having the integral compressible spacer dots is preferably constructed from a polymer. In certain embodiments, a transparent flexible cover sheet may be desired, particularly in combination with touch screen devices comprising transparent substrates. A transparent polymeric material may provide high light transmission properties, is inexpensive and a sheet of polymeric material can easily be formed with integral compressible spacer dots. Suitable polymer materials include polyolefins, polyesters, polyamides, polycarbonates, cellulosic esters, polystyrene, polyvinyl resins, polysulfonamides, polyethers, polyimides, polyvinylidene chloride, polyethers, polyvinylidene fluoride, polyurethanes, polyphenylenesulfides, polytetrafluoroethylene, polyacetals, polysulfonates, polyester ionomers, and polyolefin ionomers as well as copolymers and blends thereof. Polycarbonate polymers have high light transmission and strength properties. Copolymers and/or mixtures of these polymers can be used.

Polyolefins particularly polypropylene, polyethylene, polymethylpentene, and mixtures thereof are suitable. Polyolefin copolymers, including copolymers of propylene and ethylene such as hexene, butene and octene can also be used. Polyolefin polymers are suitable because they are low in cost and have good strength and surface properties and have been shown to be soft and scratch resistant.

The polymeric materials used to make flexible transparent cover sheet in preferred embodiments of this invention preferably have a light transmission greater than 92%. A polymeric material having an elastic modulus greater than 500 MPa is suitable. An elastic modulus greater than 500 MPa allows for the integral compressible spacer dots to withstand the compressive forces common to touch screens. Further, an elastic modulus greater than 500 MPa allows for efficient assembly of a touch screen as the dots are tough and scratch resistant.

A spacer dot integral to the flexible cover sheet significantly reduces unwanted reflection from an optical surface such as those present in prior art touch screens that utilize polymer beads. An integral spacer dot also provides for superior durability as the dot location is fixed in the flexible cover sheet of the invention and is not subject to movement during vibration or extended use. The integral compressible spacer dots of the invention preferably have heights between 2 and 100 micrometers, more preferably between 2 and 50 micrometers, and most preferably between 10 and 50 micrometers, although shorter or taller spacer dots might be desired in some applications. The height of the spacer dot should put enough distance between the top of the spacer dot and the conductive coating on the substrate so that inadvertent electrical contact between conductive coating on the substrate and the conductive coating on the flexible sheet can be avoided, at least when no touch is applied to the touch screen. In particular, the height should be at least somewhat greater than the size of possible asperities or other defects in the conductive coating(s) that could potentially bridge the gap if the spacer dots were not tall enough. In general, larger height of the spacer dots means a lower probability of inadvertent electrical contact and a higher actuation force. A height less than 10 micrometers, and in particular less than 2 micrometers, may not provide sufficient spacing for the two conductive layers resulting in false actuation. A height greater than 50 micrometers, and in particular greater than 100 micrometers, separating the layers may require too high a compression force to connect the two conductive layers and thus may be problematic.

A desired maximum diameter for the spacer dots generally depends on their heights, so that the ratio of height to diameter is often the relevant quantity, although the absolute value of the diameter may also be important. Dots having a smaller diameter may be less visible to a user. Dots having a smaller diameter may also lead to better electronic performance of the touch panel due to less total area coverage of the spacer dots. Very large dots may decrease touch screen resolution and/or increase the activation force. In illustrative cases, spacer dot maximum diameters may be in the range of 1 to 60 micrometers, although smaller or larger spacer dots might be desired in some applications. In some embodiments, the spacer dots preferably have height to width ratios of between 0.5 and 3.0. It has been found that this range of aspect ratios enables long lasting touch screen spacer dots that are compressible and durable.

The integral compressible spacer dots preferably are spaced apart by a distance of greater than 0.25 millimeter, more preferably greater than 1 millimeter. Spacing less than 0.25 millimeter may require compressive forces that are too high to achieve contact between the two conductive layers. The polymer and dot profile used for the flexible cover sheet with integral compressible spacer dots according to this invention preferably provide for elastic deformation of greater than 1 million actuations. Elastic deformation is the mechanical property of the spacer dot to recover at least 95% of its original height after an actuation. High-quality touch screens are also required to have a consistent actuation force over the useful lifetime of the device. Spacer dot fatigue can result in increasing actuation forces over the lifetime of the device, resulting in scratching of the surface of the touch screen and user frustration.

A variety of polymeric materials, inorganic additives, layered swellable materials having a high aspect ratio wherein the size of the materials in one dimension is substantially smaller than the size of the materials in the other dimensions, organic ions and agents serving to intercalate or exfoliate the layer materials such as block copolymers or an ethoxylated alcohols, smectite clays, nanocomposite materials, and means to form the flexible cover sheet and integral spacer dots are described in US Patent Application US20040090426, which is hereby incorporated by reference.

The size, shape, height, locations and spacing of compressible spacer dots can be chosen to meet the pressure and reliability usage specification of a particular application. The locations may form a pattern or may be random. Having the spacer dots vary in shape and/or spacing creates a touch screen that has varying levels of sensitivity, accuracy, and durability across the touch screen to tailor each area of the touch screen to its application. For example, the profile of the embossing can vary to complement a variety of flexible cover sheet materials so as to maximize the lifetime, clarity, and physical properties of the flexible cover sheet. In certain embodiments, it may desirable to size and position the integral compressible spacer dots in a pattern that establishes at least one of differentiated minimum required activation forces and differentiated durability for selected areas of the touch screen as described in copending, commonly assigned U.S. Ser. No. 10/988,340, the disclosure of which is incorporated by reference herein.

Figure 5:
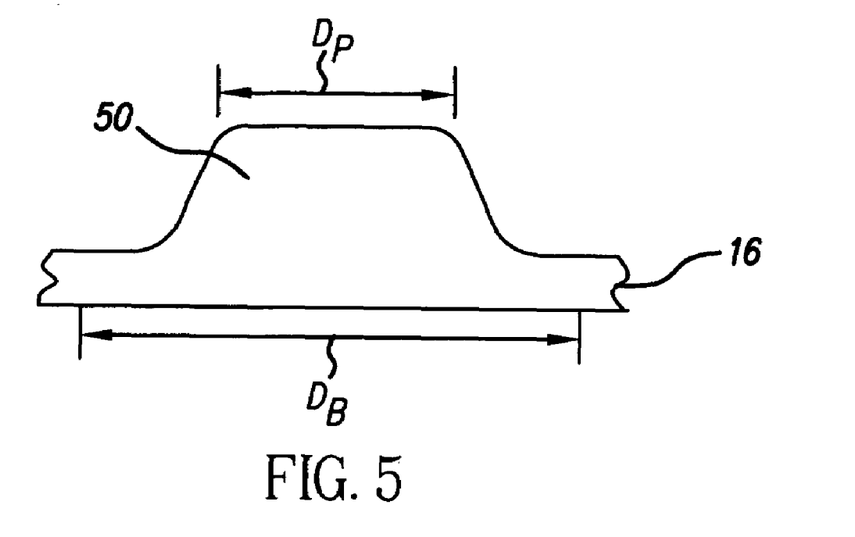
FIG. 5 is a diagram illustrating one of the integral spacer dots according to the present invention.
Figure 7:
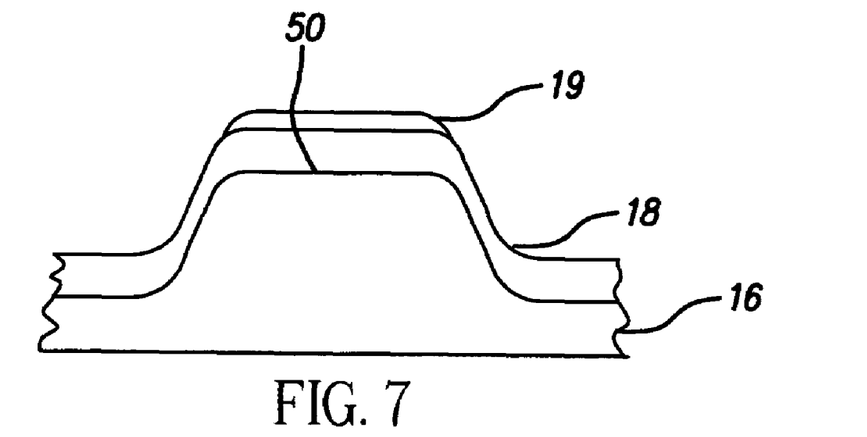
FIG. 7 is a diagram illustrating one of the integral spacer dots having a coating with an insulative material according to an embodiment of the present invention.

Referring to FIG. 5, the profile of a truncated conical spacer dot 50 that has a base diameter $D_b$ that is 75% larger than the peak diameter $D_p$ is shown integral to the flexible cover sheet 16. This geometry has been shown to provide an excellent compression profile allowing moderate levels of compressive force applied by the user to activate the touch screen. The base diameter being 75% larger than the peak diameter provides mechanical toughness, reduces dot wear and provides for over 1 million actuations before a 5% loss in height. A suitable material for the compressive dot illustrated in FIG. 5 is a blend of polyester and polycarbonate where the polycarbonate is present in the amount of 10% by weight of the polyester. FIG. 7 illustrates such an integral spacer dot 50 having a conductive layer 18 coating over it and an insulative material layer 19 applied selectively and locally over the conductive layer to the peak of the spacer dot.

Figure 6:
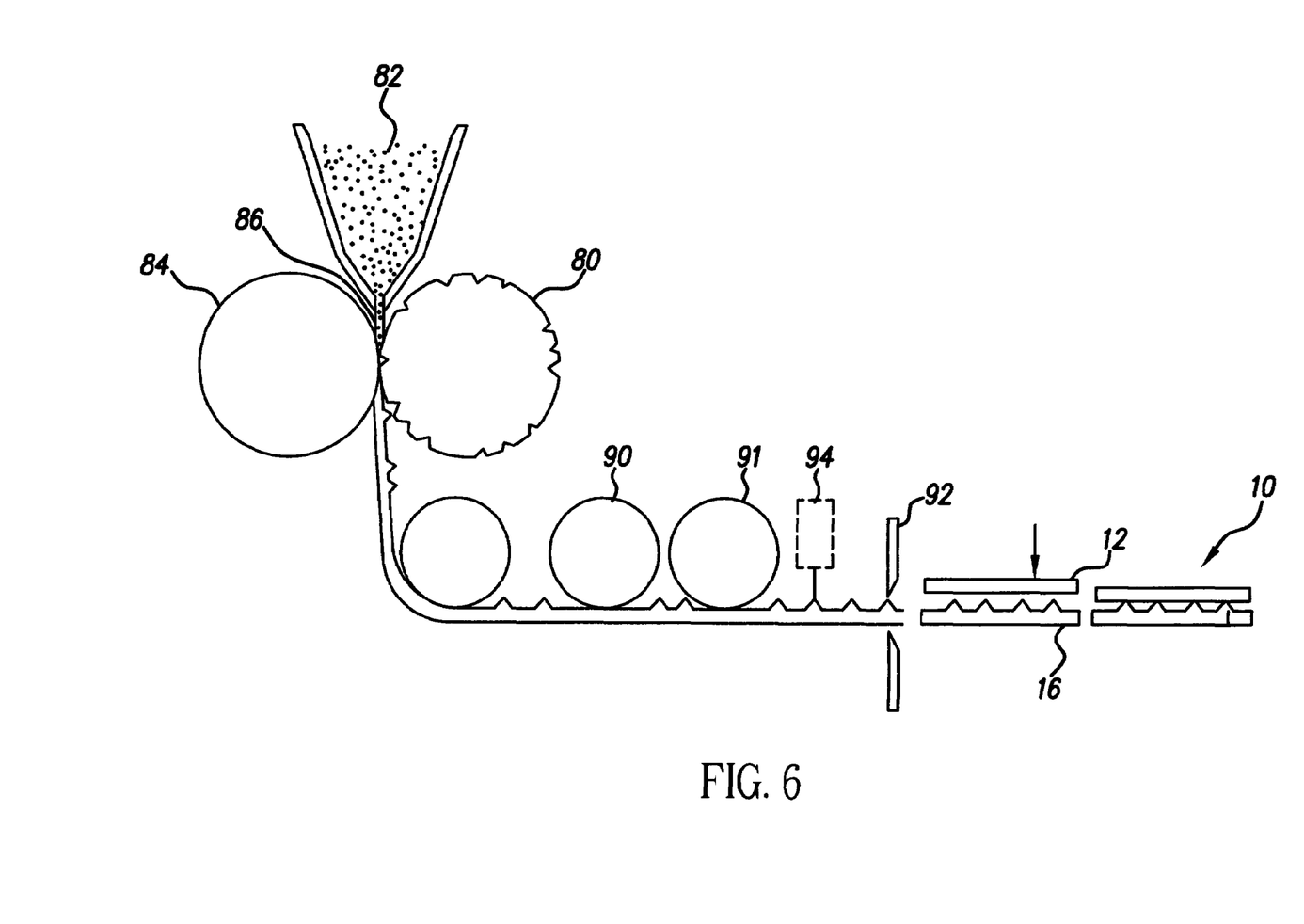
FIG. 6 is a schematic diagram illustrating one method of making a touch screen according to the present invention.

Referring to FIG. 6, in a preferred embodiment of the present invention, the integral spacer dots and flexible cover sheet are injection roll molded as a single unit. In the injection roll molding process a polymer 82 is heated above its melting point, and is injected under pressure into a nip 86 formed by a patterned roller 80 and an elastomer covered backing roller 84 in direct contact with the patterned roller 80. The patterned roller 80 has a pattern of cavities for forming the integral spacer dots. As the polymer is injected into the nip 86, some of the melted polymer fills the cavities of the patterned roller to form the integral spacer dots and the balance of the polymer is squeezed into a flat sheet having the integral spacer dots. After the integral spacer dots and flexible cover sheet have been formed, the flexible cover sheet with integral spacer dots is mechanically released from both of the rollers.

Next, a conductive layer is applied 90 on the flexible cover sheet, over and between the integral spacer dots. Suitable coating methods including curtain coating, roll coating and spin coating, slide coating, ink jet printing, patterned gravure coating, blade coating, electro-photographic coating and centrifugal coating may be used to apply the conductive coating. The conductive coating may typically have a sheet resistivity of between 100 and 600 ohms/square. The surface on which the conductive material is deposited can be pre-treated for improved adhesion by any of the means known in the art, such as acid etching, flame treatment, corona discharge treatment, glow discharge treatment or can be coated with a suitable primer layer. However, corona discharge treatment is the preferred means for adhesion promotion. The coating may then be dried or cured to form a conductive layer.

In preferred embodiments, the conductive layer is transparent, and may be formed, e.g., from materials which include metal oxides, for example indium tin oxide, indium zinc oxide, and antimony tin oxide, and electrically conductive polymers such as substituted or unsubstituted polythiophenes, substituted or unsubstituted polypyrroles, single-wall carbon nanotubes, and substituted or unsubstituted polyanilines. Preferred electrically conducting polymers for the present invention include polypyrrole styrene sulfonate (referred to as polypyrrole/poly (styrene sulfonic acid) in U.S. Pat. No. 5,674,654), 3,4-dialkoxy substituted polypyrrole styrene sulfonate, and 3,4-dialkoxy substituted polythiophene styrene sulfonate. The most preferred substituted electronically conductive polymers include poly(3,4-ethylene dioxythiophene styrene sulfonate).

Once the conductive layer is in place, insulative layer 19 is locally applied on the conductive layer selectively over the integral spacer dots. As shown in FIG. 6, material forming the insulative layer may be locally applied, e.g., with an inkjet device 94. Alternatively, as the spacer dots protrude from a main surface of the cover sheet, the second conductive layer will form peaks in areas over the spacer dots, and the insulative material layer may be locally applied by contacting the peaks of the second conductive layer formed over the spacer beads with a surface coated with the insulative material, for example a roller 91. Insulative materials may include e.g. various plastics and polymers, which may advantageously be coated from solvent solutions or directly in molten or softened form to improve adhesion. Specific contemplated insulative materials include cellulose triacetate, polytetrafluoroethylene, and epoxy resins. FIG. 7 illustrates the effect. Referencing FIG. 2, the absence of insulative material layer 19 between the spacer dots allows for electrical contact when the cover sheet 16 is deformed and pressed against the substrate 12 thereby causing the conductive layer 14 and conductive layer 18 to touch and close an electrical circuit.

As further illustrated in FIG. 6, the web of transparent flexible cover sheet material with integral spacer dots may then be cut 92 into individual cover sheets 16, and applied to a substrate 12 of a touch screen 10.

Figure 8:
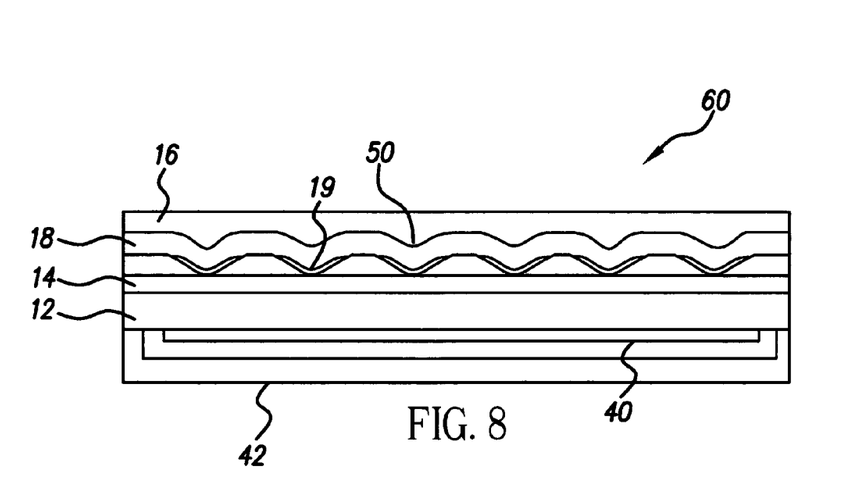
FIG. 8 is a side-view of a resistive touch screen of an embodiment of the present invention integrated with a bottom-emitting flat-panel display.
Figure 9:
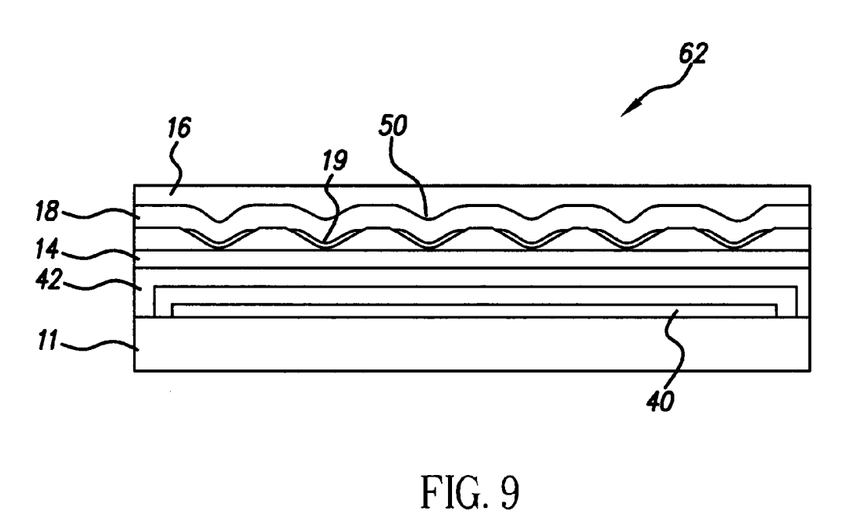
FIG. 9 is a side-view of a resistive touch screen of an embodiment of the present invention integrated with a top-emitting flat-panel display.

Referring to FIGS. 8 and 9, the touch screen of the present invention can be integrated into a flat-panel display by using either the cover or the substrate of the flat-panel display as a transparent substrate 12 of the touch screen. The flat-panel display may emit light through a transparent cover or through a transparent substrate. As shown in FIG. 8, a flat-panel OLED display with an integrated touch screen 60 includes a substrate 12, OLED materials 40 and encapsulating cover 42 for the OLED display. On the opposite side of the substrate 12, the touch screen includes the first conductive layer 14 and the flexible transparent cover sheet 16 with integral compressible spacer dots 50 and having a second conductive layer 18 with insulated peaks 19.

As shown in FIG. 9, an OLED display with an integrated touch screen 62 includes a substrate 11, OLED materials 40, and an encapsulating cover 42 for the OLED display, which serves as the substrate for the touch screen. On the opposite side of the encapsulating cover 42, the touch screen includes the first conductive layer 14 and the flexible transparent cover sheet 16 with integral compressible spacer dots 50 and having a second conductive layer 18 with insulated peaks 19.

The number of features per area is determined by the spacer dot size and the pattern depth. Larger diameters and deeper patterns require fewer numbers of features in a given area. Therefore the number of features is inherently determined by the spacer dot size and the pattern depth. The spacer dots of the invention may also be manufactured by vacuum forming around a pattern, injection molding the dots and embossing dots in a polymer web. While these manufacturing techniques do yield acceptable dots, injection roll molding polymer onto a patterned roller allows for the flexible cover sheet with spacer dots of the invention to be formed into rolls thereby lowering the manufacturing cost.

Injection roll molding has been shown to more efficiently replicate the desired complex dot geometry compared to embossing and vacuum forming. It is further contemplated that the flexible cover sheet is cut into the desired size for application to an LCD or OLED flat-panel display, for example.

The present invention may be used in conjunction with any flat panel display, including but not limited to OLED and liquid crystal display devices.

The entire contents of the patents and other publications referred to in this specification are incorporated herein by reference.

The invention has been described in detail with particular reference to certain preferred embodiments thereof, but it will be understood that variations and modifications can be effected within the spirit and scope of the invention.

PARTS LIST

10 resistive touch screen
11 substrate
12 substrate
13 finger
14 first conductive layer
16 cover sheet
18 second conductive layer
19 insulative layer
20 spacer dots
40 OLED materials
42 encapsulating cover
50 integral compressible spacer dots 60 OLED display with integrated touch screen
62 OLED display with integrated touch screen
80 patterned roller
82 polymer
84 backing roller
86 nip
90 conductive layer application
91 insulative layer application
92 cut step
94 inkjet application

The invention claimed is:

1. A resistive touch screen, comprising:
   a) a substrate;
   b) a first conductive layer located on the substrate;
   c) a flexible cover sheet having integral compressible spacer dots; and
   d) a second conductive layer located on the flexible cover sheet between and over the integral spacer dots; and
   e) an insulative layer located on the second conductive layer locally over the integral spacer dots.

2. The resistive touch screen of claim 1, wherein the substrate, first conductive layer, flexible cover sheet, second conductive layer, and insulative layer are transparent.

3. The resistive touch screen of claim 2, wherein the substrate is rigid.

4. The resistive touch screen claimed in claim 1, wherein the substrate of the touch screen is the substrate or cover of a flat-panel display device.

5. The resistive touch screen claimed in claim 4, wherein the flat-panel display device is an OLED display device.

6. The resistive touch screen of claim 1, wherein said flexible cover comprises one of the group including: polymer, polyolefin polymer, polyester, polycarbonate, and a blend of polyester and polycarbonate.

7. The resistive touch screen of claim 1, wherein said integral compressible spacer dots comprise cylinder-shaped dots, cube-shaped dots, pyramid-shaped dots, or sphere-shaped dots.

8. The resistive touch screen of claim 1, wherein said substrate comprises a rigid material.

9. The resistive touch screen of claim 1, wherein the second conductive layer comprises an electrically conductive polymer.

10. The resistive touch screen of claim 9, wherein the conductive layer comprises one of the group including polypyrrole styrene sulfonate, 3,4-dialkoxy substituted polypyrrole styrene sulfonate, and 3,4-dialkoxy substituted polythiophene styrene sulfonate, poly(3,4-ethylene dioxythiophene styrene sulfonate.

11. The resistive touch screen of claim 1, wherein the second conductive layer comprises metal oxides, including indium tin oxide or indium zinc oxide.

12. The resistive touch screen of claim 1, wherein the insulative layer comprises plastic or polymer material.

13. The resistive touch screen of claim 12, wherein the insulative layer material comprises cellulose triacetate, polytetrafluoroethylene, or epoxy resins.

14. A method of making a resistive touch screen, comprising the steps of:
   a) providing a substrate;
   b) forming a first conductive layer on the substrate;
   c) providing a flexible cover sheet having integral compressible spacer dots on the cover sheet;
   d) forming a second conductive layer on the flexible cover sheet between and over the integral compressible spacer dots;
   e) forming an insulative layer locally on the second conductive layer over the integral compressible spacer dots; and
   f) locating the flexible cover sheet over the substrate such that when a force is applied to the flexible cover sheet at the location of one of the compressible spacer dots, the compressible spacer dot is compressed to allow electrical contact between the first and second conductive layers.

15. The method claimed in claim 14, wherein the flexible cover sheet is provided as a web in a continuous roll, the integral spacer dots are molded in the continuous roll, and the sheet is cut from the roll.

16. The method claimed in claim 14, wherein the integral spacer dots are formed in the flexible cover sheet by injection roll molding.

17. The method claimed in claim 14, wherein the spacer dots are formed in the flexible cover sheet by applying heat and pressure to the flexible cover sheet by a mold including a reverse image of the spacer dots.

18. The method claimed in claim 14, wherein the insulative layer is formed through local deposition of a solution of an insulating material on the second conductive layer over the integral spacer dots.

19. The method claimed in claim 18, wherein the deposition of the insulating material is achieved with an inkjet device.

20. The method of claim 18, wherein the second conductive layer comprises an electrically conductive polymer.

21. The method claimed in claim 14, wherein the second conductive layer forms peaks in areas over the spacer dots and local formation of the insulating material on the second conductive layer over the integral spacer dots is achieved by contacting the peaks of the second conductive layer with a surface coated with the insulating material.

22. The method claimed in claim 21, wherein the coated surface is a roller.

* * * * *